United States Patent
Rygaard (10) Patent No.: US 7,861,242 B2
(45) Date of Patent: *Dec. 28, 2010

(54) MOBILE APPLICATION MORPHING SYSTEM AND METHOD

(75) Inventor: Christopher A. Rygaard, Sunnyvale, CA (US)

(73) Assignee: Aramira Corporation, Moffett Field, CA (US)

( * ) Notice: Subject to any disclaimer, the term of this patent is extended or adjusted under 35 U.S.C. 154(b) by 1146 days.

This patent is subject to a terminal disclaimer.

(21) Appl. No.: 10/686,897

(22) Filed: Oct. 15, 2003

(65) Prior Publication Data

US 2005/0188377 A1    Aug. 25, 2005

Related U.S. Application Data (60) Provisional application No. 60/419,312, filed on Oct. 16, 2002, provisional application No. 60/419,288, filed on Oct. 16, 2002.

(51) Int. Cl.
*G06F 9/44* (2006.01)
*G06F 9/445* (2006.01)

(52) U.S. Cl. .................. 717/176; 717/168; 717/171; 717/172; 717/177

(58) Field of Classification Search .......... 717/120–176; 709/201–203; 719/316, 317
See application file for complete search history.

(56) References Cited

U.S. PATENT DOCUMENTS

| | | | |
|---|---|---|---|
| 5,633,932 A | 5/1997 | Davis et al. | |
| 5,850,516 A | 12/1998 | Schneier | |
| 5,850,517 A | 12/1998 | Verkler et al. | |
| 5,963,731 A | 10/1999 | Sagawa et al. | |
| 5,968,176 A | 10/1999 | Nessett et al. | |
| 5,974,549 A | 10/1999 | Golan | |
| 6,009,456 A | 12/1999 | Frew et al. | |
| 6,065,118 A | 5/2000 | Bull et al. | |
| 6,141,754 A | 10/2000 | Choy | |
| 6,148,327 A | 11/2000 | Whitebread et al. | |
| 6,173,405 B1 | 1/2001 | Nagel | |
| 6,189,103 B1 | 2/2001 | Nevarez et al. | |
| 6,192,354 B1 | 2/2001 | Bigus et al. | |
| 6,233,601 B1 | 5/2001 | Walsh | |
| 6,272,528 B1 | 8/2001 | Cullen et al. | |
| 6,308,181 B1 | 10/2001 | Jarvis | |

(Continued)

FOREIGN PATENT DOCUMENTS

EP    0942370 A1    9/1999

OTHER PUBLICATIONS

Zhou et al., "Adaptation and Specialization for High performance Mobile Agents," USENIX, 1999.*

(Continued)

*Primary Examiner*—Insun Kang
(74) *Attorney, Agent, or Firm*—Fish & Richardson P.C.

(57) ABSTRACT

The morphing system and method alters the behavior and/or state of a jumping application according to the needs and/or requirements of the target host. In more detail, the jumping application system gathers information about the computer hosts to which jumping applications can be sent, and uses that information to alter the code (the computer instructions) or the state (the data) of each jumping application as each jumping application is dispatched.

42 Claims, 6 Drawing Sheets

U.S. PATENT DOCUMENTS

| | | | |
|---|---|---|---|
| 6,539,416 | B1 | 3/2003 | Takewaki et al. |
| 6,615,232 | B2 | 9/2003 | Suzuki et al. |
| 6,622,157 | B1 | 9/2003 | Heddaya et al. |
| 7,058,699 | B1* | 6/2006 | Chiou et al. ............... 709/219 |
| 2002/0147974 | A1* | 10/2002 | Wookey ..................... 717/176 |
| 2003/0187660 | A1* | 10/2003 | Gong ......................... 704/277 |

OTHER PUBLICATIONS

Tahara et al., "Secure and efficient mobile agent application reuse using patterns," ACM, vol. 26, Issue 3, pp. 78-85, May 2001.*

Ad Astra ,"Jumping Beans," Ad Astra Engineering, Dec. 3, 1998, pp. 1-44.*

*Intrusion Detection with Mobile Agents*, Computer Communications Journal, Special Issue on Intrusion Detection, Jansen.

*Determining Privileges of Mobile Agents*, Proceedings of the Computer Security Applications Conference, Dec. 2001. Jansen.

*A Privilege Management Scheme for Mobile Agent Systems*, First International Workshop on Security of Mobile Multiagent Systems, Autonomous Agents Conference, May 2001. Jansen.

*A Denial of Service Resistant Intrusion Detection Architecture*, Computer Networks, Special Issue on Intrusion Detection, Elsevier Science BV, Nov. 2000. Mell et al.

*Countermeasures for Mobile Agent Security*, Computer Communications, Special Issue on Advanced Security Techniques for Network Protection, Elsevier Science BV, Nov. 2000.

*Privilege Management of Mobile Agents*, National Information System Security Conference, Oct. 2000. Jansen et al.

*Mobile Agent Attack Resistant Distributed Hierarchical Intrusion Detection Systems*, Second International t Workshop on Recent Advances in Intrusion Detection, Sep. 1999, Purdue University. Mell et al.

*Applying Mobile Agents to Intrusion Detection and Response* NISTIR 6416, Sep. 1999. Jansen et al.

*Mobile Agent Security*, NIST Special Publication 800-19, Aug. 1999. Jansen et al.

*Agents for the Masses: Is it Possible To Make Development of Sophisticated Agents Simple Enough To Be Practical?* IEEE Intelligent Systems, Special Issue on Agents, May-Jun. 1999. Bradshaw et al.

*Network Security Testing Using Mobile Agents* Third International Conference and Exhibition on the Practical Application of Intelligent Agents and multi-Agent Technology. London, UK Mar. 1998. Karygiannis.

*A Framework for Multi-Mode Authentication: Overview and Implementation Guide*. NISTIR 7046 Aug. 2003. Jansen et al.

*Picture Password: A Visual Login Technique for Mobile Devices*. NISTIR 7030, Jul. 2003. Jansen et al.

*Security Policy Management for Handheld Devices*. The Int'l. Conference on Security and Management (SAM'03), Jun. 2003. Jansen et al.

*Authenticating Users on Handheld Devices*, Proceedings of the Canadian Information Technology Security Symposium, May 2003. Jansen.

*Policy Expression and Enforcement for Handheld Devices*, NISTIR 6981, May 2003. Jansen et al.

*Assigning and Enforcing Security Policies on Handheld Devices*, Proceedings of the Canadian Information Technology Security Symposium, May 2002. Jansen et al.

PCT International Search Report dated Jan. 2, 2003 corresponding to PCT US02/21186.

Office Action dated Dec. 18, 2003 for U.S. Appl. No. 09/764,548, filed Jan. 18, 2001.

Office Action dated Dec. 22, 2003 for U.S. Appl. No. 09/591,034, filed Jun. 9, 2000.

Office Action dated Dec. 31, 2003 for U.S. Appl. No. 09/758,941, filed Jan. 10, 2001.

Office Action dated Dec. 31, 2003 for U.S. Appl. No. 09/645,028, filed Aug. 23, 2000.

W.A. Jansen, "A Privilege Management Scheme for Mobile Agent Systems" NIST May 2001.

Wayne Jansen, "Countermeasures for Mobile Agent Security", NIST Nov. 2000.

Wayne Jansen et al., "Privilege Management of Mobile Agents", NIST Oct. 2000.

W. Jansen, "Intrusion Detection with Mobile Agents" Computer Communications Journal, Special Issue on Intrusion Detection Oct. 2, 2001.

"Jumping Beans™ White Paper" Ad Astra Engineering, Incorporated Dec. 1998.

Jansen et al., "Mobile Agent Security", NIST Special Publication 800-19: pp. 1-38, Aug. 1999.

* cited by examiner

MOBILE APPLICATION MORPHING SYSTEM AND METHOD

PRIORITY CLAIM

This application claims priority under 35 USC 119(e) and 120 from U.S. Provisional Patent Application Ser. Nos. 60/419,312 and 60/419,288, both filed on Oct. 16, 2002 and entitled "Jumping Application Security System" and "Mobile Application Morphing System And Method" respectively, both of which are incorporated herein by reference.

FIELD OF THE INVENTION

This invention relates generally to a jumping application morphing system and method and in particular to a jumping application morphing system and method that may be implemented for jumping applications that execute on various devices.

BACKGROUND OF THE INVENTION

In traditional computing systems, communication between computers is either code (a software application) or data (a file containing information) and there is no notion of a program moving between hosts while it is being executed. Thus, with a typical computing system, a person may execute a software application (e.g., Microsoft Word) on his/her own computer and then forward the results of the execution of the software application (e.g. a Microsoft Word document) to another user. The other user may then view the Microsoft Word document by executing his own copy of Microsoft Word. A user may also send another user an executable software application file that the other user may download and execute on his own computer. However, these traditional computing systems do not recognize a single instantiation of a software program that may be executed by one or more different computers in order to complete the execution of the software application.

A jumping application, sometimes also called a jumping app or a mobile app or a mobile application or a mobile agent, is a currently executing computer software application/program, or part of a currently executing program that can physically move from one computer to another (between hosts) while it is being executed. A jumping application's software may or may not have been previously installed on a particular computer prior to the arrival of the jumping application. The jumping applications are said to jump from one computer to another computer, and the process of jumping from one computer to another computer is also referred to as a jump.

The process of initiating a jump between computers is commonly known as a dispatch. Typically, each jumping application will carry with it an ordered list or tree of hosts which the jumping application must visit during its execution, and such a list or tree is called the jumping application's itinerary. The computers that can receive and dispatch jumping applications are called hosts. The collection of hosts, computer networks, and software which executes and supports the jumping applications, and the jumping applications themselves, is called the jumping application system.

A jumping application typically has at least two parts: the state and the code. The state of the jumping application contains all of the data stored, carried, and/or computed by the particular jumping application. The code of the jumping application is the set of computer instructions which the host computer is intended to carry out on behalf of the jumping application during the execution of the jumping application by the particular host computer. In addition, a jumping application have other parts, including security parameters, an itinerary, a data store, an audit log, etc. A jumping application's software may or may not have been previously installed on the computers prior to the arrival of the jumping application.

Jumping application have demonstrable benefits for computer systems. However, they also create new problems not encountered in traditional computing systems. In particular, a jumping application that is tuned for optimal performance on one computer system might be sub-optimal on another computer. For example, a jumping application which confines its user interface to a very small window might be good for execution on a handheld device, but it would not take advantage of the large screen typically found on desktop computers. Thus, there is a need to alter part or all of the behavior and/or state of a jumping application according to (a) the needs and/or capabilities of a target host computer and (b) the needs and/or capabilities of the jumping application when dispatching to that target host computer.

Current implementations of jumping application systems do not support the notion of altering part or all of the behavior and/or state of a jumping application according to the needs and/or capabilities of a target host computer and the needs and/or capabilities of the jumping application. Thus it is desirable to provide this functionality in a jumping application system so that the jumping application morphing system in accordance with the invention has the capability to alter part or all of a jumping application's behavior and/or state which is called morphing, and the process of altering part or all of the behavior and/or state is also called morphing.

SUMMARY OF THE INVENTION

The jumping application morphing system and method in accordance with the invention alters the behavior and/or state of a jumping application according to the needs and/or requirements of the target host. In more detail, the jumping application system gathers information about the computer hosts to which jumping applications can be sent, and uses that information to alter the code (the computer instructions) or the state (the data) of each jumping application as each jumping application is dispatched.

Thus, in accordance with the invention, a jumping application system is provided wherein the jumping application system may be a star architecture or a peer-to-peer network, or some combination of the two. The jumping application system comprises a console computer to that executes instructions for morphing jumping applications and one or more host computers connected to the console computer wherein each host computer executes the jumping applications that jump between the hosts during execution. The console computer further comprises means for altering the state and/or behavior of each jumping application as it jumps between hosts during execution, based on the information it has gathered. In addition, a peer-to-peer jumping application morphing system and method are also described.

Thus, in accordance with the invention, a jumping application morphing system is provided. The jumping application morphing system has one or more hosts between which a jumping application jumps during the execution of the jumping application wherein the jumping application system alters the code and/or state of a jumping application as it jumps from host to host.

In accordance with the invention, a computer implemented jumping application morphing console that morphs a jumping application that is jumping between one or more hosts connected to the morphing console is provided. The morphing console comprises a morphing module that alters a jumping application during the execution of the jumping application and a database that contains one or more behavior packages for the jumping application, wherein each behavior package alters the behavior of the jumping application for a particular host. The morphing module further comprises instructions that determine a next host to which the jumping application is being dispatched and instructions that alter the behavior of the jumping application for the next host based on a behavior package associated with the next host.

In accordance with the invention, a computer-implemented method for altering the behavior of a jumping application in a jumping application system to optimize its execution for a particular host in the jumping application system is provided. In the method, a next host to which a jumping application is being dispatched is determined and the behavior of the jumping application is altered for the next host based on a behavior package associated with the next host.

In accordance with the invention, a jumping application morphing system is provided. The system comprises a management and security console and one or more host computers connected to the console by a computer network, wherein each host computer executes a jumping application. The console further comprises a morphing module that alters a jumping application as the jumping application jumps between hosts, a database that contains one or more behavior packages for the jumping application, wherein each behavior package alters the behavior of the jumping application for a particular host. The morphing module further comprises instructions that determine a next host to which the jumping application is being dispatched and instructions that alter the behavior of the jumping application for the next host based on a behavior package associated with the next host.

In accordance with the invention, a server computer for a jumping application morphing system is provided. The server comprises a processor, a memory connected to the processor, and a database connected to the processor that contains one or more behavior packages for the jumping application, wherein each behavior package alters the behavior of the jumping application for a particular host. The memory further comprises instructions that determine a next host to which the jumping application is being dispatched and instructions that alter the behavior of the jumping application for the next host based on a behavior package associated with the next host.

DETAILED DESCRIPTION OF A PREFERRED EMBODIMENT

The invention is particularly applicable to a computing environment in which computers of different capabilities and requirements (such as, for example, different input/output capabilities or different memory sizes) are running, and it is in this context that the invention will be described. It will be appreciated, however, that the system and method in accordance with the invention has greater utility since it may be used for systems with similar computers that are being used for dissimilar purposes. To better understand the invention, a typical jumping application and an example of its execution will be provided.

Figure 1:
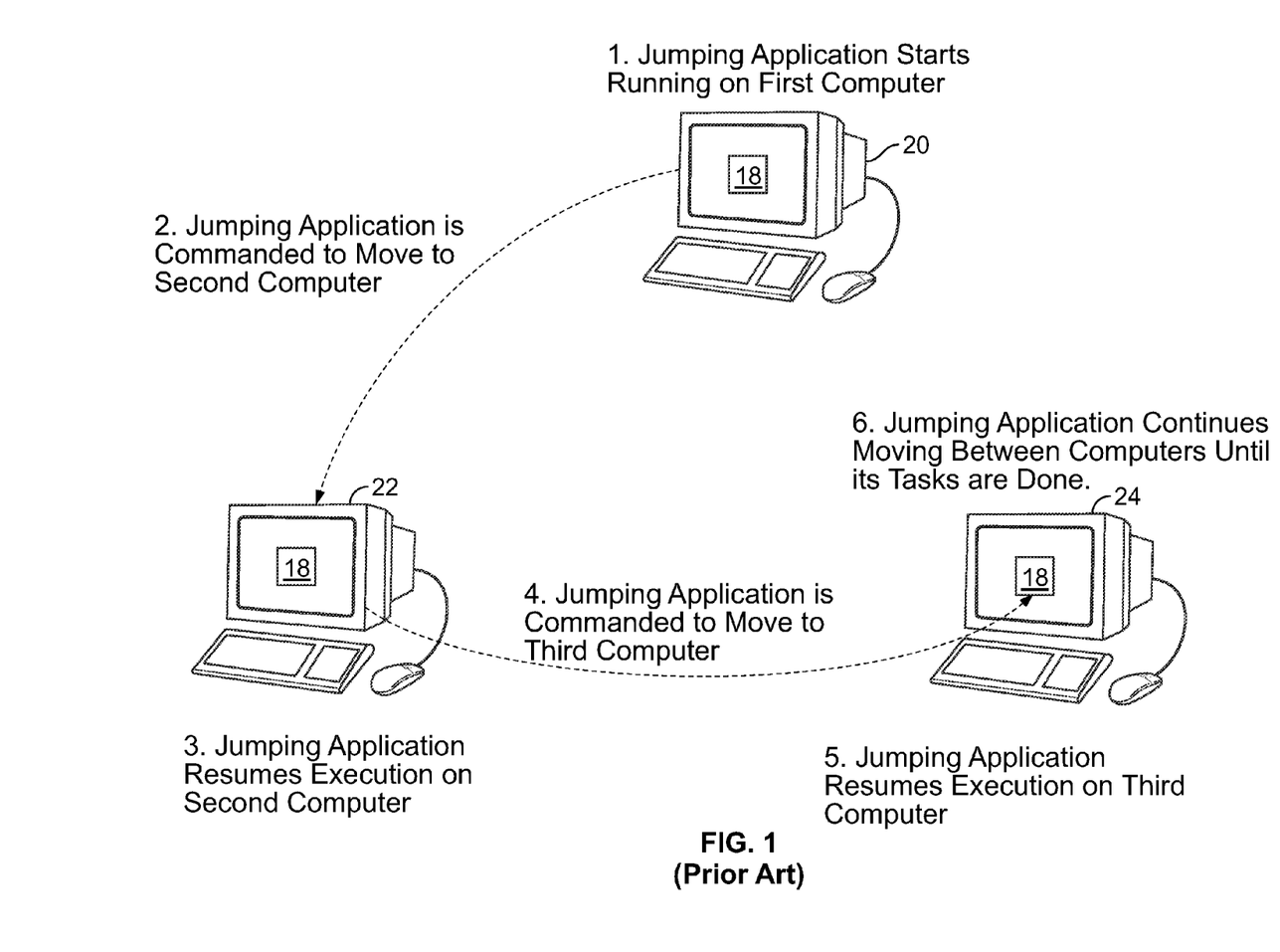
FIG. 1 illustrates a typical jumping application.

FIG. 1 illustrates a typical jumping application 18 and its operation. In particular, the jumping application 18 may start its execution on a first computer 20, known as a host. At some point, the jumping application 18 contains instructions or is instructed to move to a second computer 22 and the jumping application moves to the second computer. Once at the second computer, the jumping application resumes its execution on the second computer. At some later time, the jumping application is instructed to move to a third computer 24 and the jumping application jumps to the third computer and resumes its execution on the third computer. In this manner, the jumping application can execute itself on one or more different computers at different times as is well known for jumping applications. To understand the concept of a jumping application, an example of a typical jumping application will now be provided.

Figure 2:
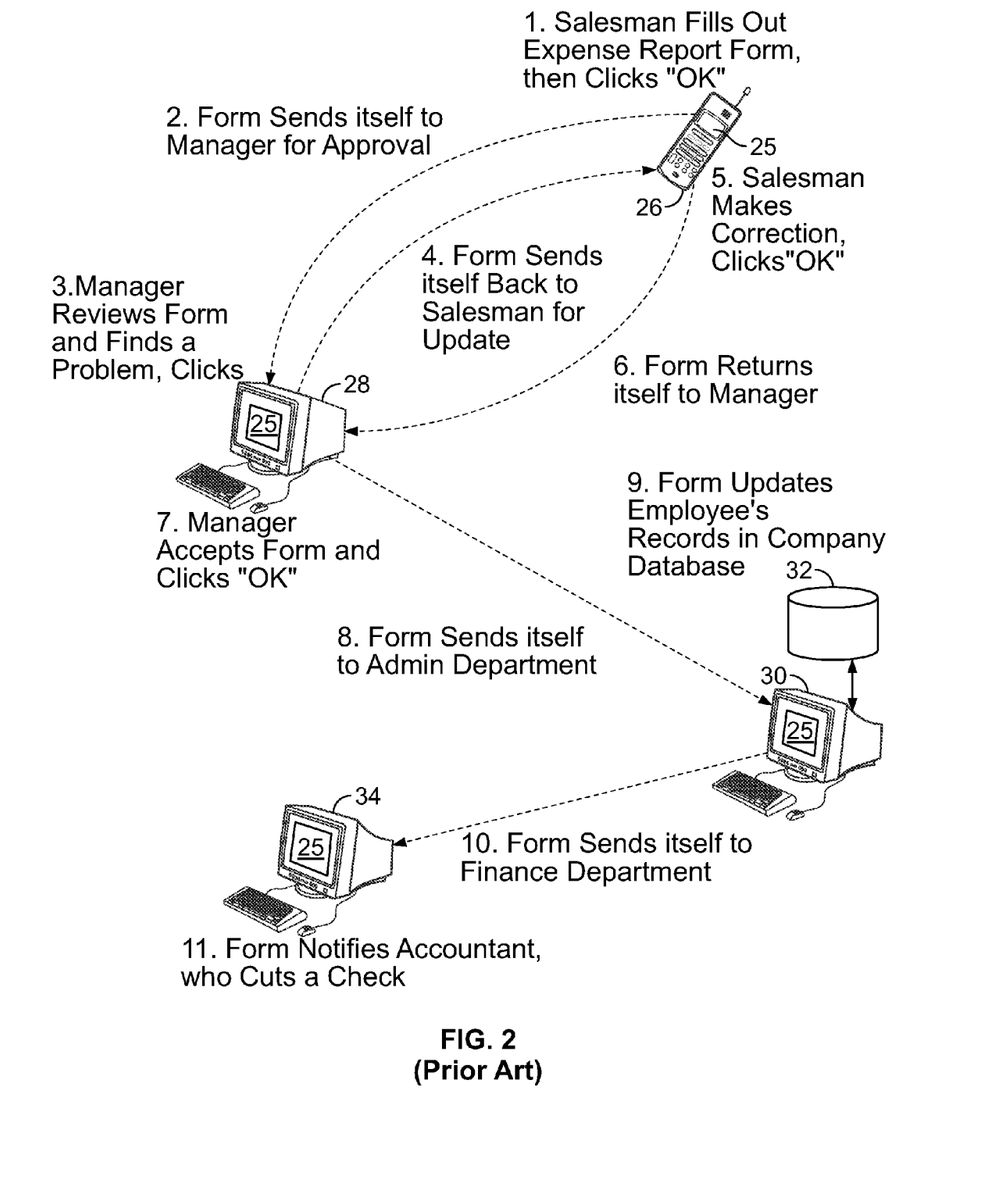
FIG. 2 illustrates an example of the execution of a typical jumping application.

FIG. 2 is a diagram illustrating an example of a typical jumping application 25 and in particular an intelligent expense report form. In this example, the jumping application facilitates the expense report generation and processing by automatically performing some functions. In particular, a salesman at a handheld computer 26 may initially fill out an expense report form and click OK when the expense report is ready. Automatically, the jumping application 25 then sends itself to a manager's computer 28 for approval by the manager. In this example, the manager finds a problem with the form and returns it to the salesman so that the form automatically sends itself back to the salesman's computer 26 for update. Next, the salesman makes the necessary corrections and clicks OK to send it automatically back to the manager's computer 28. With the further updates, the manager accepts the expense form and clicks "OK". The jumping expense report form then automatically sends itself to a computer 30 in the administration department. The jumping expense report form the executes on the administration department computer and updates a database 32 with the new information in the expense form. Next, the jumping expense report form automatically sends itself to a computer 34 of the accountant. The mobile expense report then automatically starts to execute on the accountant's computer and notifies the accountant that a check is needed so that the accountant can cut the check for the salesman. Thus, the jumping application has automated much of the expense report submission process so that the people involved in the process do not have to worry about ensuring that the expense report is approved. This example of a jumping application is well known and understood by one of ordinary skill in the art. Now, an example of a morphing jumping application will be described.

Figure 3:
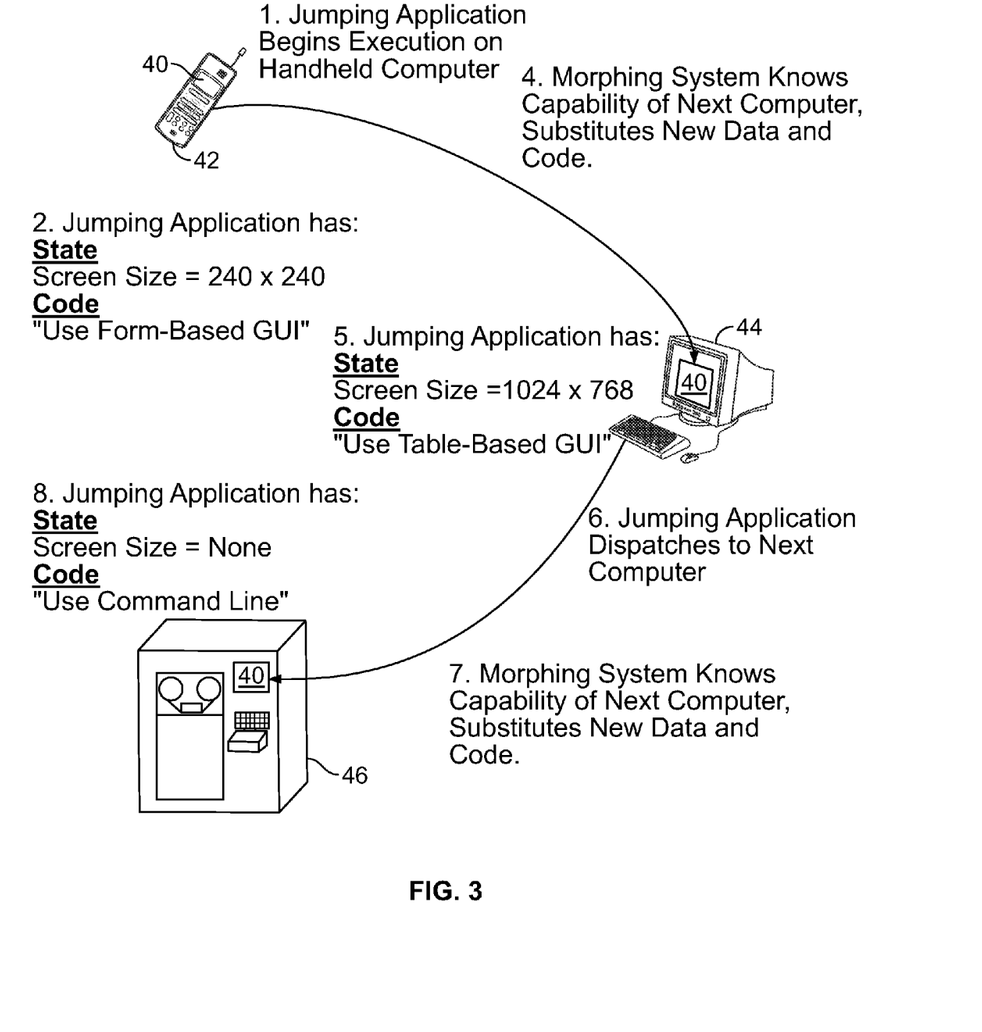
FIG. 3 is a diagram illustrating a typical application of morphing of a jumping application.

FIG. 3 illustrates an example of a jumping application morphing system in accordance with the invention. In this example, a jumping application 40 begins execution on a handheld computer device 42, that may be, for example, a cellular phone. In this example, the screen on the handheld device is small, only 240 pixels by 240 pixels and this information about the screen size of the device 42 is part of the jumping application's state information. Because the screen size is small, the jumping application software works best as a series of forms with each form representing one record, so this is part of the jumping application's behavior and code. At some point, the jumping application is instructed to jump to the next computer 44. In this example, the next computer is a typical desktop computer with a larger screen size of 1024 pixels by 768 pixels. The morphing jumping application system in accordance with the invention knows the larger screen size of the next computer and therefore substitutes new data and code into the morphing jumping application. In particular, the morphing jumping application software in this example will work better on this larger screen size as a table showing all of the records simultaneously, so the morphing system replaces the screen size portion of the state, and the GUI portion of the behavior so that a larger screen size is used and a table-based graphical user interface (GUI) is used. When the jumping application executes on the new computer 44, its state includes a new screen size and new GUI behavior. At a later time, the jumping application is instructed to jump to the next computer 46. In this example, the next computer is a mainframe with text-based terminals (which is known to the morphing system), so the morphing system replaces the screen size portion of the state and the GUI portion of the behavior with new state and code data that optimizes the execution of the jumping application for the next computer 46. In this example, when the jumping application executes on the new computer 46, it does not use a GUI (and no screen is specified, and uses a command line instead. In this manner, the jumping application is morphed (its state and code information/data is altered) by the morphing system in accordance with the invention so that the execution of the jumping application is optimized for the particular host computer on which the jumping application is going to be executed. Now, a jumping application morphing system in accordance with the invention will be described.

Figure 4:
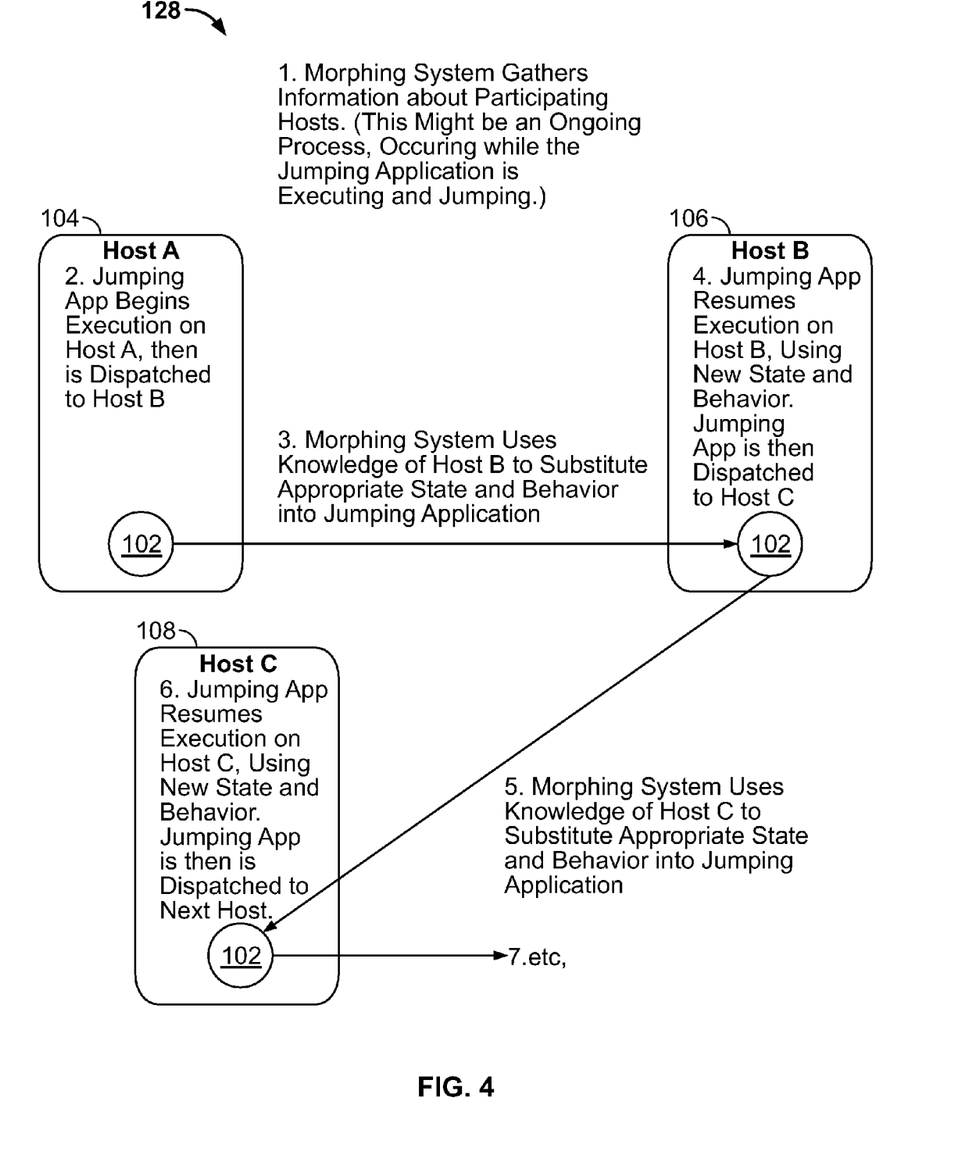
FIG. 4 is a diagram illustrating how the jumping application morphing system in accordance with the invention alters both the state and the behavior of a jumping application.

FIG. 4 illustrates the jumping application morphing system 128 in accordance with the invention. In this system, the jumping application morphing system gathers information about each of the hosts to which the jumping application is going to jump during the execution of the jumping application. It will be appreciated that this information gathering process can be automatic or manual, and can occur at discrete times or can be an ongoing process. In any case, the jumping application morphing system has some knowledge of the different capabilities and/or needs of each participating host. The different capabilities of the participating host may include, for example, the characteristics of the computer system or the characteristics of the operator of the computer system which may be defined by a system administrator prior to the execution of the jumping application. For example, the computer system characteristics may include, but is not limited to, hardware and/or software characteristics of the system, such as its screen size, its memory size, its operating system, the interface to its operating system, an interface to a particular piece of software being executed by the particular operating system, the security privileges associated with the operating system and any other characteristics for which the jumping application's behavior may be altered. The characteristics of the operator of the computer system may include, but is not limited to, a disability of the user, such as a blind user, a security clearance of the user or any other characteristics of the user for which the jumping application's behavior may be altered. As shown in FIG. 4, a jumping application 102 begins executing on Host A 104 and establishes some state and behavior. Later, the jumping application 102 is instructed to dispatch to Host B 106. In transit, the jumping application morphing system uses its knowledge of Host B 106 to substitute appropriate state and/or behavior/code into the jumping application for better performance on Host B 106. It will be appreciated that this morphing process can occur either on Host A 104, while the jumping application is in transit, on Host B 106 based on instructions from the morphing system or on the management and security console 140. In any case, when jumping application 102 executes on Host B 106, it uses the updated state and/or behavior so that its execution is optimized for Host B. Later the jumping application is instructed to dispatch to Host C 108. In transit, the jumping application morphing system uses its knowledge of Host C 108 to substitute appropriate state and/or behavior into the jumping application for better performance on Host C 108. This process can continue for the life of the jumping application. Now, an example of a jumping application morphing system in accordance with the invention will be described.

Figure 4A:
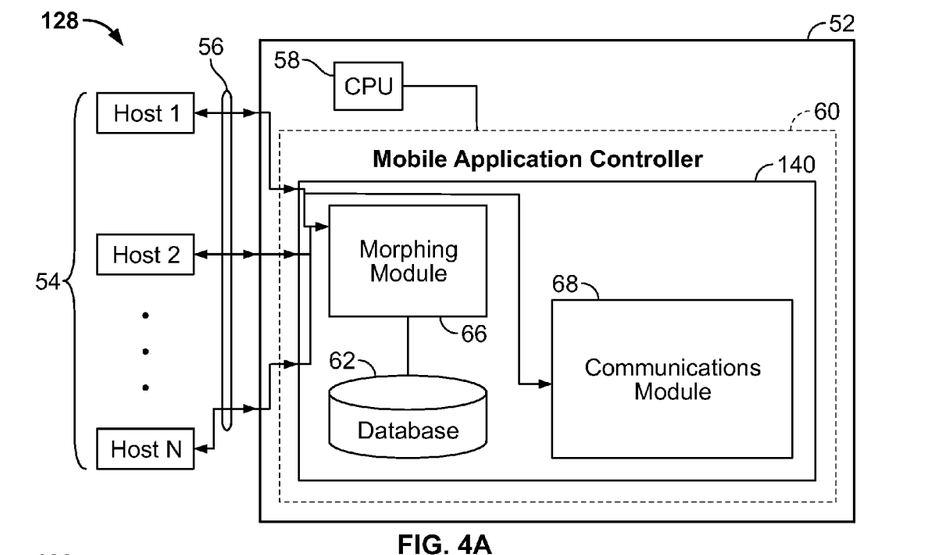
FIG. 4A is a diagram illustrating an example of a client/server architecture for a jumping application morphing system in accordance with the invention.

FIG. 4A is a diagram illustrating a jumping application morphing system 128 in accordance with the invention. As described above, this architecture of the jumping application morphing system is an example of an implementation of the jumping application morphing system as the jumping application morphing system may be implemented using various different architectures. In this example, the system 128 may include a server computer 52 and one or more host computers 54, such as Host 1, Host 2 and Host N, that may be connected to the server computer by a computer network 56, such as a wide area network, the Internet, a local area network, the World Wide Web, a telephone line and a modem or the like. The computer network permits the server and hosts to communicate data between each other using well known protocols and data formats. Each host may be a typical computer system that includes the well known computing resources, such as at least a CPU and a memory, for executing a software application such as a jumping application. Each host may be a personal computer, a laptop, a server computer, a work station, a personal digital assistant, a Pocket PC computer, a cellular phone, etc. with sufficient computing power to execute a jumping application. For the example of the preferred embodiment described herein, each host has different capabilities, such as, for example, different input/output capabilities, different memory sizes, different processors. The server 52 may include one or more CPUs 58 and a memory 60 along with a persistent storage device (not shown) for permanently storing one or more software applications or modules that may be executed by the CPU by loading the software applications or modules into the memory. The server may also include well known input/output devices that are not shown as well as a device for connecting to the computer network 56, such as a modem. DSL modem, etc. The server may also include a database 62 that stores one or more jumping applications along with information about the jumping applications as described below. The database 62 may further include one or more different behavior packages and one or more different host proxies which permit the morphing system to alter the state and/or code of a jumping application in order to optimize the performance of the jumping application for a particular host. When the server computer is being utilized as the jumping application morphing system 128, the memory of the server has a jumping application controller module 140 (also known as a management and security console) stored in it that, when executed by the CPU, control the security of the one or more jumping application(s) in the jumping application system and the hosts as described below. In a preferred embodiment, the jumping application controller 140 may be one or more software application or modules, but the controller may also be implemented using hardware.

In a preferred embodiment, the jumping application controller 140 may include a morphing software module 66 and a communications software module 68. The morphing module may control the operation of the jumping application morphing system and therefore 1) determine the capabilities of a next host to which a jumping application is jumping; and 2) alter the state and/or code of the jumping application to optimize its performance for the particular host. The communications module may control the communications with the hosts associated with/connected to the jumping application morphing system, such as receiving the request to transmit the jumping application to another host and sending the new state and/or code to the jumping application for execution on the other host. Now, an example of the architecture of a preferred embodiment of the jumping application morphing system will be described.

Figure 5:
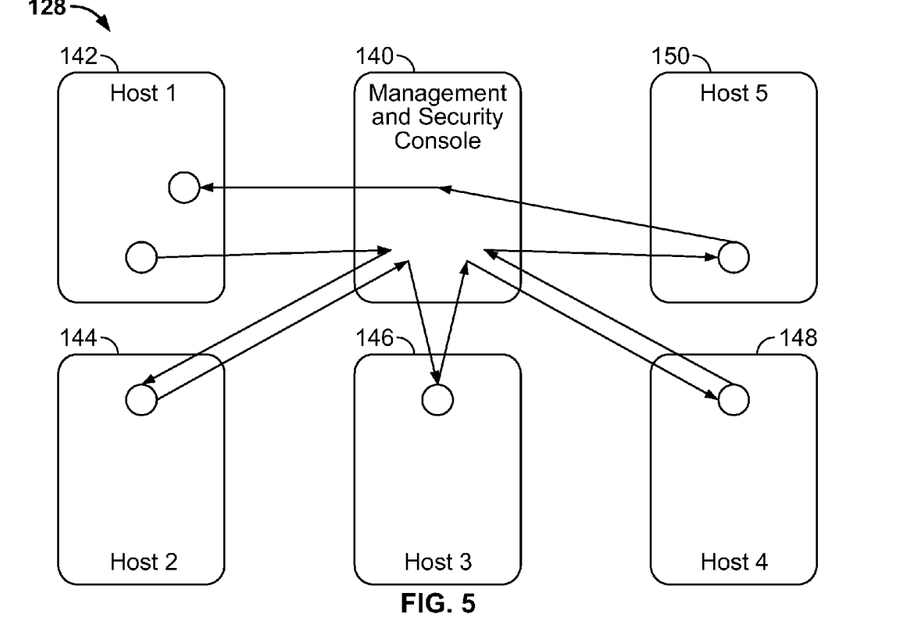
FIG. 5 is a diagram illustrating the architecture of the preferred embodiment of the jumping application morphing system in accordance with the invention.

FIG. 5 illustrates an architecture of a preferred embodiment of a jumping application morphing system 128 in accordance with the invention. In this architecture, there is the Management and Security Console 140 (MaSC) which forms the hub of a spoke-and-hub arrangement. In this preferred embodiment, the MaSC 140 comprises one or more pieces of software code being executed by a computing device, such as a server, which receive the mobile application, manage the morphing process of the jumping application (e.g. alter the state and/or behavior of the jumping application) and forwards the jumping application to the next host as described above with reference to FIG. 4A. The code for the MaSC may be implemented using any of several well-known programming languages. In this arrangement, one or more hosts 142, 144, 146, 148, and 150 (Host 1, Host 2, Host 3, Host 4 and Host 5 shown in FIG. 5, but the jumping application morphing system in accordance with the invention may be used with any number of hosts) communicate with the MaSC. In this embodiment, the MaSC collects information about the capabilities of the hosts with which it is communicating.

In addition, each host sends the jumping application to the MaSC on each jump, and the MaSC forwards the jumping application to the next host prescribed in the itinerary. With the preferred embodiment of the invention, the jumping application passes through the MaSC on each jump. While the jumping application is in the MaSC, the MaSC alters the state and/or behavior of the jumping application in accordance with the invention before forwarding the jumping application to the next host. On each jump the MaSC uses its information about the target host to determine how to alter the state and/or behavior of the jumping application.

In the preferred embodiment, each jumping application is created by some person called a developer, who can create different behaviors and/or states for the jumping application. In this embodiment, the developer will collect the computer instructions for the different behaviors into different packages. (Typically such a package is a simple computer file containing the specific behavior and/or state.) Each such collection of computer instructions is called a "behavior package". A developer can create multiple behavior packages for a single jumping application on a single host, and different multiple behavior packages for the same jumping application on different hosts. For example, a developer can create (1) a behavior package for a Graphical User Interface (GUI) screen and (2) a behavior package for a mouse input device, and both of these behavior packages might be appropriate for use on a typical desktop computer. The same developer can create (3) a behavior package for a command-line screen and (4) a behavior package for keyboard input, and these two additional packages might be appropriate for a text-based terminal. To carry the example further, the developer could provide (5) a behavior package for touch-screen input, and the combination of items (1) and (5) might be appropriate for touch-screen desktop computers. Thus, the behavior packages may be used to alter the state and/or behavior/code of a jumping application to optimize the performance of the jumping application for a particular host.

In the preferred embodiment, a person called a system administrator at the MaSC 140 may manually enter information about the hosts in the system. This is done by logically arranging the hosts into groups. In accordance with the invention, membership in such a group implies information about a host. For example, each such group can contain one behavior package for each potential jumping application in the jumping application system. By placing a host logically in such a group, the system administrator implicitly provides information about the hosts by providing different behaviors and/or states intended for each host, for each jumping application. In other embodiments of the invention, the information about each host in the jumping application system may be automatically determined, such as, for example via a query process.

It will be appreciated that the spoke-and-hub architecture of the preferred embodiment shown in FIG. 5 is not directly required to support this invention. However, this preferred embodiment includes such an arrangement for certain benefits in security not directly required by this invention. In addition, the inventor of this invention has already implemented this preferred embodiment. However, in accordance with the invention, different architectures of the jumping application system, such as a peer-to-peer system, etc., are within the scope of the invention. Now, an example of the preferred embodiment of the jumping application morphing system will be described.

Figure 6:
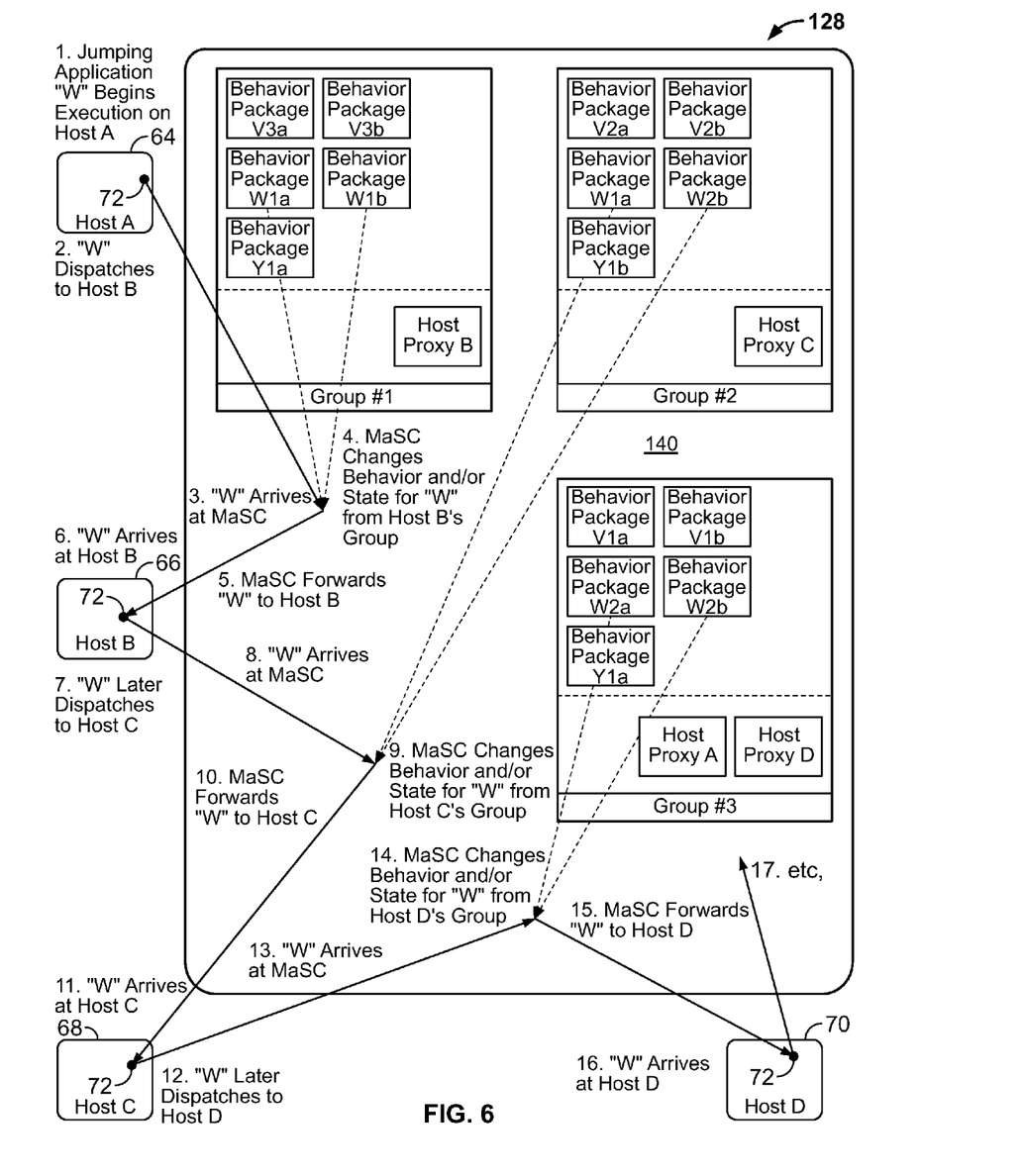
FIG. 6 is a diagram illustrating the details of the preferred embodiment of the jumping application morphing system.

FIG. 6 illustrates the details of a preferred embodiment of a morphing system 128 comprising the MaSC 140, Host A 64, Host B 66, Host C 68, and Host D 70. In this illustration, the system administrator has received behavior packages for three different jumping applications, "V", "W", and "Y". In particular, the developer of "V" has created 6 behavior packages, the developer of "W" has created 4 behavior packages, and the developer of "Y" has created three behavior packages. In this illustration, the system administrator has created three logical groups of hosts, "Group #1", "Group #2", and "Group #3". The system administrator has distributed the behavior packages submitted by the developers to the groups as shown in FIG. 6. It will be appreciated that this embodiment will apply to any number of jumping applications, to any number of host groups, and any number of hosts. In the preferred embodiment, each participating host has exactly 1 corresponding proxy in the MaSC, and each such proxy resides in exactly 1 logical group of hosts as shown in FIG. 6. Thus, Host A and Host D are part of Group #3, Host C is part of Group #2 and Host B is part of Group #1. Each of the steps of the preferred embodiment described below may be implemented, in the preferred embodiment, as one or more instructions (computer code executing on the management and security console and/or a host computer) that implement the operations described below. In accordance with the invention, these instructions may be written in various well known programming languages.

In FIG. 6, a jumping application W 72 is created on Host A in step 1 and later dispatched to Host B in step 2. In the preferred embodiment, W is sent to the MaSC in step 3 and the MaSC determines the next host for the jumping application based on the itinerary of the jumping application. The MaSC determines that Host B's proxy is in Group 1, so the MaSC retrieves new behavior and/or state for W from Group 1, and supplies it to the jumping application in step 4. This can add, remove, and/or replace state and/or behavior in the jumping application. The MaSC then forwards the jumping application to Host B in step 5 where it resumes execution using the new behavior and/or state in step 6. Later W is dispatched to Host C in step 7, and the jumping application is sent to the MaSC in step 8. The MaSC determines that Host C's proxy is in Group 2, so the MaSC retrieves new behavior and/or state for W from Group 2 in step 9, and supplies it to the jumping application. The MaSC then forwards the jumping application to C in step 10 where it resumes execution in step 11 using the new behavior and/or state. Later, W is dispatched to Host D in step 12, and the jumping application is sent to the MaSC in step 13. The MaSC determines that Host D's proxy is in Group 3, so the MaSC retrieves new behavior and/or state for W from Group 3 in step 14, and supplies it to the jumping application. The MaSC then forwards the jumping application to D in step 15 where it resumes execution using the new behavior and/or state in step 16. This process can continue for as long as needed for W to complete its task. In accordance with the invention, the state and/or behavior/code of the jumping application is altered by the morphing system in order to optimize the execution of the jumping application for the particular host. In accordance with the invention, the execution of jumping applications "V" and "Y" may also be altered during its execution to optimize it for a particular host. In accordance with the invention, a particular jumping application may be sent between one or more hosts with the same capabilities so that the state and/or behavior/code of the jumping application is not altered. Furthermore, the jumping application may be sent to one or more hosts with the same capabilities, but dissimilar purposes and the jumping application's behavior may be altered for each host. For example, two users may both have identical desktop computers with the same hardware and software characteristics, but one computer is used by an engineer while the other computer is used by an assistant for the president of the company. The engineer and secretary will have different file access privileges and access to different programs and the behavior of the jumping application may be altered to accommodate those characteristics of the user. Furthermore, the jumping application may be altered to distinguish between a secure computer system and a unsecured computer system wherein the jumping application, for example, might permit access to more sensitive files when it is jumping to the secure computer system.

While the foregoing has been with reference to a particular embodiment of the invention, it will be appreciated by those skilled in the art that changes in this embodiment may be made without departing from the principles and spirit of the invention.

The invention claimed is:

1. A jumping application morphing console, including one or more processors, that alters a jumping application that is jumping between two or more hosts connected to the morphing console, the morphing console comprising:
   a morphing module that alters the jumping application as the jumping application jumps between hosts including receiving the jumping application jumping from a first host to a next host, altering the jumping application, and sending the jumping application to the next host;
   a database that contains one or more behavior packages for the jumping application, where each behavior package alters the behavior of the jumping application for a particular host; and
   where the morphing module includes instructions that determine the next host to which the jumping application is being dispatched and instructions that alter the behavior of the jumping application for the next host as the jumping application jumps from the first host to the next host using a first behavior package of the one or more behavior packages, the first behavior package associated with the next host.

2. The console of claim 1, wherein instructions that determine the next host further comprises instructions that identify the next host of the jumping application based on an itinerary of the jumping application.

3. The console of claim 1, wherein the instructions that alter the behavior of the jumping application further comprise instructions that gather information about each host of the two or more hosts in order to determine the capabilities of each host.

4. The console of claim 3, wherein the instructions that gather information further comprise instructions that store one or more particular behavior packages that are associated with each host of the jumping application system where each behavior package adjusts one of a state and a behavior of a jumping application using the capabilities of the particular host.

5. The console of claim 4, wherein the instructions that alter the behavior further comprise instructions that identify the first behavior package associated with the next host for the jumping application and instructions that modify one of the state and the behavior of the jumping application using the identified behavior package.

6. The console of claim 1 further comprising instructions that forward the jumping application with the altered behavior onto the next host.

7. The console of claim 1, wherein the database further comprises one or more groups and each group contains one or more behavior packages associated with a set of capabilities of a particular host computer.

8. The console of claim 7, wherein the particular host computer is assigned to a group based on the capabilities of the host computer.

9. The console of claim 1, wherein the database further comprises a plurality of behavior packages associated with each jumping application wherein each behavior package for the jumping application is associated with a particular set of capabilities of a corresponding host computer.

10. A jumping application morphing console, including one or more processors, that alters a jumping application that is jumping between two or more hosts connected to the morphing console, the morphing console comprising:
   means for storing one or more behavior packages for the jumping application, wherein each behavior package alters the behavior of the jumping application for a particular host;
   means for determining a next host to which the jumping application is being dispatched; and
   means for altering the behavior of the jumping application from a first host and destined for the next host using a first behavior package of the one or more behavior packages associated with the next host when the jumping application is received from the first host during a jump from the first host and to the next host, where the console alters the behavior after the jumping application leaves the first host and before the jumping application arrives at the next host.

11. The console of claim 10, wherein the determining means further comprises means for identifying the next host of the jumping application based on an itinerary of the jumping application.

12. The console of claim 10, wherein altering means further comprises means for gathering information about each host of the jumping application system in order to determine the capabilities of each host.

13. The console of claim 12, wherein the gathering means further comprises means for storing one or more particular behavior packages that are associated with each host of the jumping application system wherein each behavior package adjusts one of a state and a behavior of a jumping application based on the capabilities of the particular host.

14. The console of claim 13, wherein the altering means further comprises means for identifying the first behavior package as associated with the next host for the jumping application and means for modifying one of the state and the behavior of the jumping application using the identified behavior package.

15. The console of claim 10 further comprising means for forwarding the jumping application with the altered behavior onto the next host.

16. The console of claim 10, wherein the database further comprises one or more groups and each group contains one or more behavior packages associated with a set of capabilities of a particular host computer.

17. The console of claim 16, wherein the particular host computer is assigned to a group based on the capabilities of the host computer.

18. The console of claim 10, wherein the database further comprises a plurality of behavior packages associated with each jumping application wherein each behavior package for the jumping application is associated with a particular set of capabilities of a corresponding host computer.

19. A computer-implemented method for altering the behavior of a jumping application in a jumping application system to optimize its execution for a particular host in the jumping application system, the method comprising:
receiving at a morphing console a jumping application in the jumping application system dispatched from a first host to a next host during a jump between the first host to the next host;
determining at the morphing console during the jump the next host to which the jumping application is being dispatched;
altering at the morphing console, using one or more processors, the behavior of the jumping application for the next host using a behavior package associated with the next host, the behavior package stored in the morphing console; and
dispatching at the morphing console the jumping application to the next host.

20. The method of claim 19, wherein determining the next host further comprises identifying the next host of the jumping application based on an itinerary of the jumping application.

21. The method of claim 19, wherein altering the behavior of the jumping application further comprises gathering information about each host of the jumping application system in order to determine the capabilities of each host.

22. The method of claim 21, wherein gathering information further comprises storing a behavior package associated with each host of the jumping application system wherein each behavior package adjusts one of a state and a behavior of a jumping application based on the capabilities of the particular host.

23. The method of claim 22, wherein altering the behavior further comprises identifying a first behavior package associated with the next host for the jumping application and modifying one of the state and the behavior of the jumping application based on the identified behavior package.

24. The method of claim 19 further comprising forwarding the jumping application with the altered behavior onto the next host.

25. A jumping application morphing system, comprising:
a management and security console;
two or more host computers connected to the console by a computer network, wherein each host computer executes a jumping application; and
wherein the console includes a morphing module that alters the jumping application as the jumping application jumps between the hosts computers, where the morphing module receives the jumping application from a first host computer and alters the jumping application before sending the jumping application to a next host computer, a database that contains one or more behavior packages for the jumping application, wherein each behavior package alters the behavior of the jumping application for a particular host computer, and wherein the morphing module includes instructions that determine the next host computer to which the jumping application is being dispatched and instructions that alter the behavior of the jumping application for the next host computer using a first behavior package of the one or more behavior packages associated with the next host computer.

26. The system of claim 25, wherein the console instructions that determine the next host computer further comprise instructions that identify the next host computer of the jumping application based on an itinerary of the jumping application.

27. The system of claim 25, wherein the console instructions that alter the behavior of the jumping application further comprise instructions that gather information about each host of the jumping application system in order to determine the capabilities of each host computer.

28. The system of claim 27, wherein the console instructions that gather information further comprise instructions that store one or more particular behavior packages associated with each host computer of the jumping application system where each behavior package adjusts one of a state and a behavior of a jumping application using the capabilities of the particular host computer.

29. The system of claim 28, wherein the console instructions that alter the behavior further comprise instructions that identify the first behavior package as associated with the next host computer for the jumping application and instructions that modify one of the state and the behavior of the jumping application using the identified behavior package.

30. The system of claim 25, wherein the console instructions further comprise instructions that forward the jumping application with the altered behavior onto the next host computer.

31. The system of claim 25, wherein the database further comprises one or more groups and each group contains one or more behavior packages associated with a set of capabilities of a corresponding host computer.

32. The system of claim 31, wherein a particular host computer is assigned to a group based on the capabilities of the host computer.

33. The system of claim 25, wherein the database further comprises a plurality of behavior packages associated with each jumping application wherein each behavior package for the jumping application is associated with a particular set of capabilities of a corresponding host computer.

34. A server computer for a jumping application morphing system, the server computer comprising:
a processor;
a memory connected to the processor;
a database connected to the processor that contains one or more behavior packages for a jumping application, where each behavior package alters the behavior of the jumping application for a particular host; and
where the memory includes instructions that determine a next host to which the jumping application, received from a first host as the jumping application jumps from the first host to the next host, is being dispatched and instructions that alter the behavior of the received jumping application for the next host using a first behavior package of the one or more behavior packages associated with the next host as the jumping application jumps from the first host to the next host.

35. The server computer of claim 34, wherein the instructions that determine the next host further comprise instructions that identify the next host of the jumping application based on an itinerary of the jumping application.

36. The server computer of claim 34, wherein the instructions that alter the behavior of the jumping application further comprise instructions that gather information about each host of the jumping application system in order to determine the capabilities of each host.

37. The server computer of claim 36, wherein the instructions that gather information further comprise instructions that store one or more particular behavior packages associated with each host of the jumping application system wherein each behavior package adjusts one of a state and a behavior of a jumping application using the capabilities of the particular host.

38. The server computer of claim 37, wherein the instructions that alter the behavior further comprise instructions that identify a first behavior package associated with the next host for the jumping application and instructions that modify one of the state and the behavior of the jumping application using the identified behavior package.

39. The server computer of claim 34 further comprising instructions that forward the jumping application with the altered behavior onto the next host.

40. The server computer of claim 34, wherein the database further comprises one or more groups and each group contains one or more behavior packages associated with a set of capabilities of a corresponding host computer.

41. The server computer of claim 40, wherein the particular host computer is assigned to a group based on the capabilities of the host computer.

42. The server computer of claim 34, wherein the database further comprises a plurality of behavior packages associated with each jumping application wherein each behavior package for the jumping application is associated with a particular set of capabilities of a corresponding host computer.

* * * * *